US010166613B2

(12) United States Patent
Pomikacsek

(10) Patent No.: US 10,166,613 B2
(45) Date of Patent: Jan. 1, 2019

(54) METHOD AND DEVICE FOR MACHINING LONGITUDINAL EDGES OF METAL WORKPIECES

(71) Applicant: Josef Pomikacsek, Mauerbach (AT)

(72) Inventor: Josef Pomikacsek, Mauerbach (AT)

( * ) Notice: Subject to any disclaimer, the term of this patent is extended or adjusted under 35 U.S.C. 154(b) by 1021 days.

(21) Appl. No.: 14/367,782

(22) PCT Filed: Dec. 4, 2012

(86) PCT No.: PCT/AT2012/000304
§ 371 (c)(1),
(2) Date: Jun. 20, 2014

(87) PCT Pub. No.: WO2013/090952
PCT Pub. Date: Jun. 27, 2013

(65) Prior Publication Data
US 2015/0117974 A1    Apr. 30, 2015

(30) Foreign Application Priority Data

Dec. 21, 2011    (AT) .................. A 1863/2011

(51) Int. Cl.
*B23C 3/12*    (2006.01)
*B23C 5/04*    (2006.01)
(Continued)

(52) U.S. Cl.
CPC ............. *B23C 3/12* (2013.01); *B23C 3/005* (2013.01); *B23C 5/04* (2013.01); *E01B 31/13* (2013.01);
(Continued)

(58) Field of Classification Search
CPC ....... B23C 3/005; B23C 2215/32; B23C 3/12; E01B 31/13; Y10T 409/304144;
(Continued)

(56) References Cited

U.S. PATENT DOCUMENTS 1,587,962 A    6/1926 Kielley
2,987,970 A *  6/1961 Watson .................. B27C 1/10
                                                409/181
(Continued)

FOREIGN PATENT DOCUMENTS

AT          301989        9/1972
DE        34 35 352       5/1986
(Continued)

OTHER PUBLICATIONS

Machine Translation JP 06-031912 U, which JP '912 U was published Apr. 1994.*

*Primary Examiner* — Erica E Cadugan
(74) *Attorney, Agent, or Firm* — Cozen O'Connor

(57) ABSTRACT

A method for machining long edges of metal workpieces (2), wherein during the machining of the workpiece (2), all the cutting edges (z) are put into engagement with the machining surface (B) over an effective length (l) and having a cutting depth (t), and the removal of the chips is effected in each case over a length which is equivalent to the tooth spacing ($a_s$) between the adjacent teeth simultaneously with their motion along the effective length (l).

4 Claims, 2 Drawing Sheets

(51) Int. Cl.
*E01B 31/13* (2006.01)
*B23C 3/00* (2006.01)

(52) U.S. Cl.
CPC .. *B23C 2210/0485* (2013.01); *B23C 2215/32* (2013.01); *B23C 2220/00* (2013.01); *B23C 2265/08* (2013.01); *Y10T 407/195* (2015.01); *Y10T 407/196* (2015.01); *Y10T 407/1946* (2015.01); *Y10T 407/1954* (2015.01); *Y10T 409/303752* (2015.01); *Y10T 409/303808* (2015.01); *Y10T 409/304144* (2015.01)

(58) Field of Classification Search
CPC . Y10T 409/303752; Y10T 409/303808; Y10T 407/1946
USPC .............................. 407/53; 409/138, 131–132
See application file for complete search history.

(56) References Cited

U.S. PATENT DOCUMENTS

| | | | | |
|---|---|---|---|---|
| 3,889,575 A * | 6/1975 | Tabert | ............... | B23C 3/005 |
| | | | | 409/180 |
| 6,592,307 B2 * | 7/2003 | Hsieh | ............... | B23C 1/20 |
| | | | | 409/139 |
| 2008/0206000 A1 * | 8/2008 | Sasu | ............... | B23C 3/18 |
| | | | | 407/29.13 |
| 2009/0317198 A1 * | 12/2009 | Hanks et al. | ........... | B23C 5/10 |
| | | | | 407/54 |

FOREIGN PATENT DOCUMENTS

| | | | |
|---|---|---|---|
| DE | 37 17 702 | | 11/1988 |
| JP | S57 71716 | | 5/1982 |
| JP | S62 44305 | | 2/1987 |
| JP | 06-031912 U | * | 4/1994 |
| WO | WO 95/20071 | | 7/1995 |

* cited by examiner

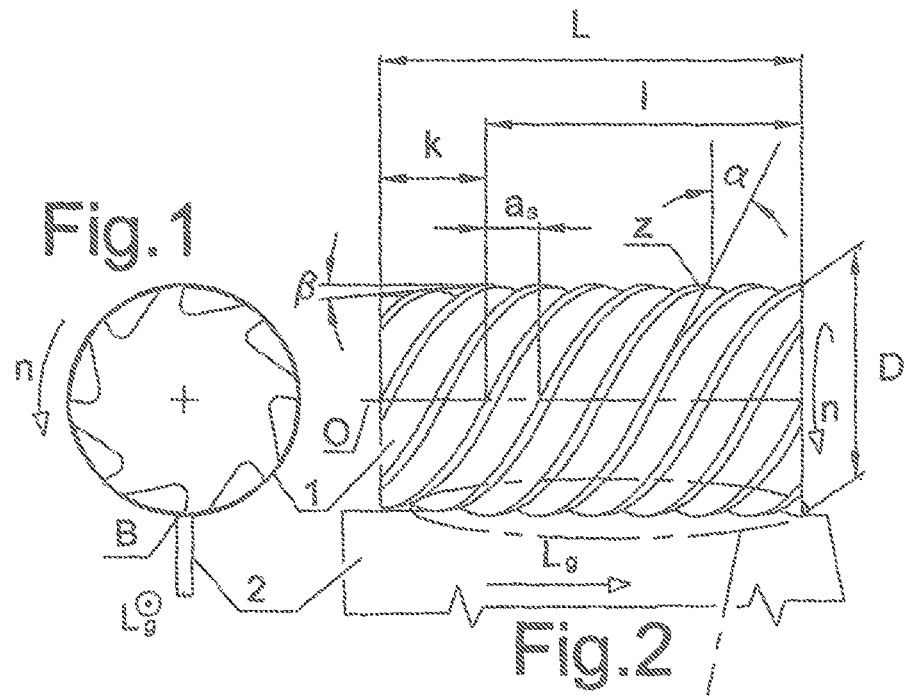
Fig.1
Fig.2
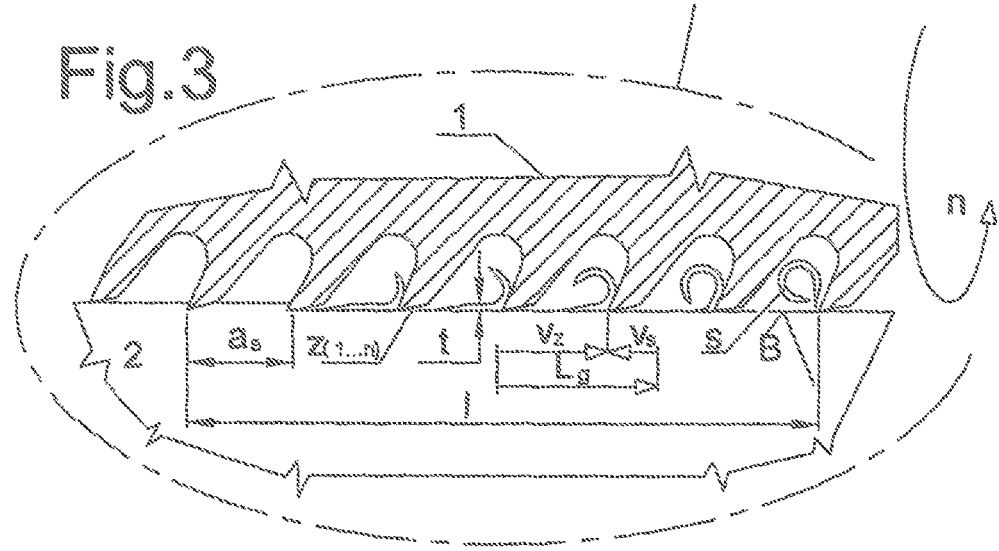
Fig.3

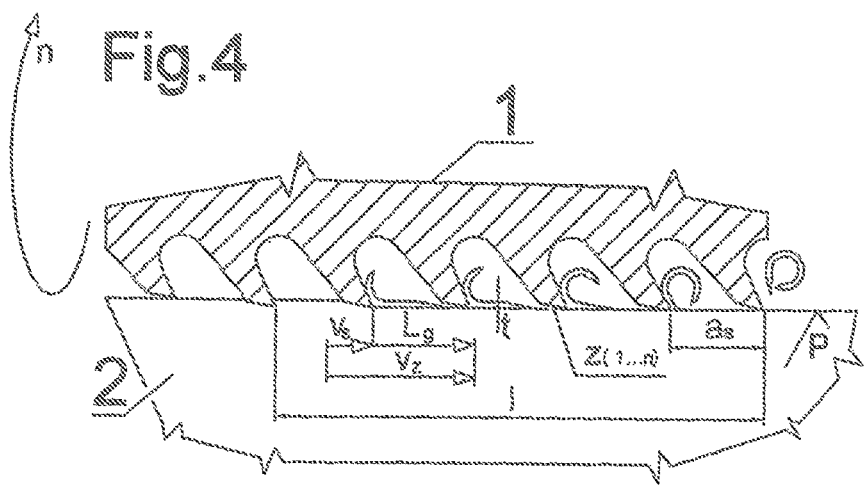
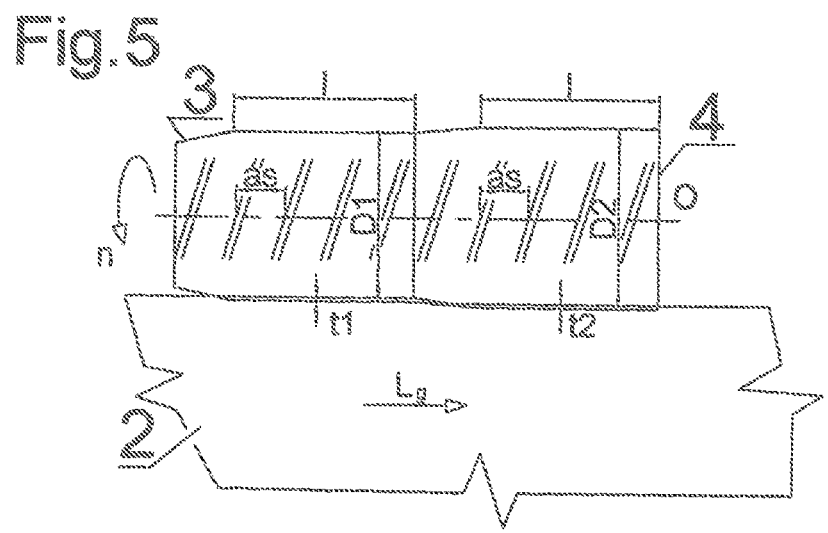
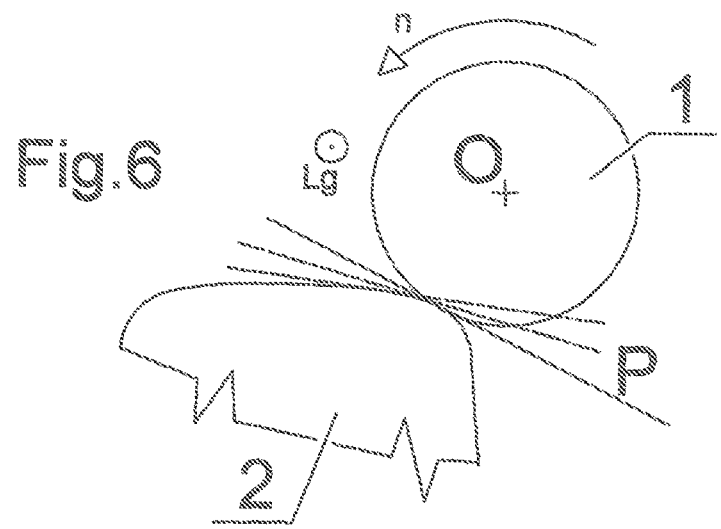

METHOD AND DEVICE FOR MACHINING LONGITUDINAL EDGES OF METAL WORKPIECES

RELATED APPLICATIONS

This is a U.S. National stage of International application No. PCT/AT2012/000304 filed on Dec. 4, 2012.

This patent application claims the priority of Austrian application no. A1863/2011 filed Dec. 21, 2011, the disclosure content of which is hereby incorporated by reference.

FILED OF THE INVENTION

The invention relates to a method and a device for machining longitudinal edges of metal workpieces.

BACKGROUND OF THE INVENTION

It is known to machine longitudinal edges of workpieces with the aid of a circumferential milling cutter. In the prior art, the job is handled in conjunction with high cutting speeds and long chips. The cutting speed is typically substantially higher than the feed rate. Attainable practical feed rates are typically above 100 m/min and are sometimes associated with short service lives and poor economy. In various areas of application, there is a need for increasing the feed rates and improving the economy. The teeth of the known tools that are simultaneously in engagement contact the workpiece at different cutting depths and also move along cutting arcs. As a consequence, the machining surfaces have ripples, which often lead to disadvantages in terms of applications.

From Austrian Patent Disclosure AT 301989, an embodiment with a circumferential milling cutter for machining the longitudinal edges of sheet-metal bands guided between guide rollers is known. The axis of rotation of the tool is disposed perpendicular to the plane of the sheet metal. The cutting edges contact the machining surface in the same direction or the opposite direction of the feed direction, depending on the pitch circle. This creates comma-shaped chips, which in proportion to their length necessarily allow only slight spacing of the respective tooth advancement. The result is a cutting speed that is substantially higher than the feed rate. Although the demand for high working speeds sometimes exceeds the limit values of the cutting speed that are technically feasible, such objectives cannot be attained by known methods.

From German Patent Disclosure DE 3435352, a circumferential milling cutter for machining longitudinal edges is known that has spiral cutting threads. The cutting threads of the tool are at a predetermined angle to the axis of rotation. The axis of rotation is inclined, such that during the engagement, the location of the cutting edges relative to the plane of the sheet metal is perpendicular. The elliptical cutting arc of the cutting threads on the machining surface is in this way flatter than its pitch circle, and as a result long chips can be achieved. Similarly to the situation already described, the cutting speed is again substantially higher than the feed rate. However, depending on the cutting arcs, the machining surface has undulations, which under some circumstances makes it necessary to do postmachining.

SUMMARY OF THE INVENTION

One object of the invention is directed to provide a method and a device for machining the longitudinal edges of workpieces which in a simple, inexpensive way makes it possible to perform machining at high feed rates and simultaneously low cutting speeds in conjunction with long service lives of the cutting threads. This object is attained, in a method of the type defined at the outset, according to an embodiment of the invention in that during the machining of the workpiece, all the cutting edges are put into engagement with the machining surface over an effective length and having a cutting depth, and the removal of the chips is effected in each case over a length which is equivalent to the tooth spacing (as) between the adjacent teeth simultaneously with their motion along the effective length.

For machining the longitudinal edges of workpieces, a circumferential milling cutter with at least one spiral cutting edge, embodied with a small angle of inclination, is provided, which simultaneously contacts the machining surface with a plurality of teeth, acting in the feed direction, with the same cutting depth in uniform spacing. The circumferential milling cutter is put into rotation in such a way that because of the relative speed between the workpiece and the teeth in the cutting region, the removal of the chips is effected in each case in a length of the tooth spacing simultaneously with the motion of the cutting edge along the engagement length. Thus according to an embodiment of the invention, in contrast to other milling methods, a feed rate that is multiple times higher than the respective metal-cutting machining speed is attained. The machining surface is then free of ripples.

Because of the predetermined relationship between the rpm-dictated speed of motion of the cutting threads and the feed rate, according to an embodiment of the invention the cut is created in each case in a length of the cutting edge spacing. During the cutting, the cutting edge moves over the machining surface along the entire contact length of the tool, at a speed that is similar to the longitudinal feed. The cutting speed is the result of the difference between them and is substantially less than the feed rate. Since all the cutting threads operate with the same cutting depth, the machining surface is smooth and free of residual undulations.

Adjusting the rpm-dependent speed of the cutting edges at the machining surface is done as a function of the typically variable feed rate and the constant tool dimensions. This object can be attained preferably by means of an electronic controller, which by continuously detecting the feed rate with the aid of an arithmetic unit adjusts the requisite rpm for performing the described function.

The features described, in comparison to other circumferential milling cutters, make many mutually supported advantages possible, especially the significant increase in the feed rate with a marked decrease in the cutting speed. These are essential prerequisites if the desired machining of longitudinal edges at especially high feed rates is to be attained economically.

In accordance with the novel method features, the possibility exists of limiting the chip length to the amount of the spacing between two tool teeth. The short chips can easily be disposed of and stored, making favorable use of space.

Manifold design options exist for the tool. The cutting edges can be embodied in the form of single- or multiple-thread spirals. The cutting edges that simultaneously act on the machining surface can be put into use with cylindrical or conical circumferential milling cutters.

BRIEF DESCRIPTION OF THE DRAWINGS

The invention will be described in further detail below in terms of exemplary embodiments in conjunction with the drawings. In the drawings:

FIG. 1 is a schematic illustration of one exemplary embodiment of a circumferential milling cutter of the invention, having the workpiece, in a front elevation view;

FIG. 2 shows the embodiment of FIG. 1 in a schematic top view;

FIG. 3 is an enlarged view of the machining surface with the cutting edges of the embodiment shown in FIGS. 1 and 2;

FIG. 4 is an enlarged view of the machining surface with the cutting edges of an embodiment which works with a cutting edge speed that is higher than the feed rate;

FIG. 5 is a schematic view of a multi-stage tool according to an embodiment of the invention;

FIG. 6 is a schematic view of a circumferential milling cutter according to an embodiment of the invention for machining tangential portions of the running surface of railroad tracks.

DETAILED DESCRIPTION OF THE DRAWINGS

In FIG. 1, a circumferential milling cutter 1 according to an embodiment of the invention and a workpiece 2 are shown schematically in a front elevation view.

FIG. 2 shows the circumferential milling cutter 1 of the invention, shown in FIG. 1, and a workpiece 2 in a schematic top view. The axis of rotation O of the cylindrical circumferential milling cutter 1 is disposed parallel to the machining surface B in such a way that simultaneously, all the spirally embodied cutting edges z are in engagement with the machining surface B over a length l. The cutting edges are embodied with multiple threads, each with a slope angle α or "angle of inclination" such that a uniform tooth spacing as is created between the cutting edges z. In the vicinity of the side toward the feed direction Lg, the circumferential milling cutter 1 is embodied conically over the length k corresponding to the angle β, thereby ensuring smooth engagement of the cutting threads in transition from the noncutting state.

Each circumferential milling cutter comprises a cylindrical region 1 and a conical region k, which result in a total tool length l. The circumferential milling cutter 1 is set into rotation in a predetermined manner in the direction n, so that the cutting edges move in the same direction as the feed direction $L_g$, but slightly slower than the feed rate.

In FIG. 3, the engagement region of the circumferential milling cutter shown in FIG. 1 can be seen. The cutting speed $v_s$ results from the difference between the feed rate $L_g$ and the speed of motion of the cutting threads $v_z$ in the vicinity of the machining surface B which is acted upon with a cutting depth t. Advantageously, the two speeds can be defined relative to one another in such a way that the cutting distance $a_s$, located between two cutting threads, is attained between the cutting positions indicated once the full engagement length l of the tool with simultaneous removal of the chip s from the machining surface B is accomplished. The limit state of this mode of operation is based on the equality of time expended on the one hand in the cutting edge movement $v_z$ along the engagement path l, and on the other of the cutting movement $v_s$ in the vicinity of a tooth spacing $a_s$. The movements can be adapted to one another with the aid of an electronic controller. Based on the electronically detected feed rate $L_g$, the tool rpm in the direction n can be regulated with the aid of an arithmetic unit in order to ensure that the procedure is properly performed.

In comparison to the known milling methods, the method of the invention has the advantageous property that the chip lengths do not exceed the tooth spacing $a_s$, which thus favors the use of circumferential milling cutters with a small tooth spacing and a high number of teeth.

By the use of small tooth spacing on a cutter head, the number of teeth of the spirally embodied cutting edges z located in the cut in the engagement path l can be increased. Thus in comparison to an embodiment with a lower number of teeth, and at the same feed rate $L_g$, a reduction in the cutting speed $v_s$ can be attained. The higher number of cutting threads additionally brings about an effective distribution of the cutting energy. Because of the curved shape of the tool jacket, the machining surface is created in the form of a shallow longitudinal groove. Depending on the tool diameter D selected and on the width of the machining surface, the deviation from a plane surface can be minimized and thus ignored.

In FIG. 4, the engagement region can be seen of a circumferential milling cutter 1 whose cutting thread speed $v_z$ is greater than the feed rate $L_g$. The cutting speed $v_s$ results from the difference between the aforementioned components. The removal of the chips s is advantageously done with a chip thickness s, corresponding to the machining depth t, simultaneously with the movement of the cutting edges along the machining edge B. The cutting length corresponds to the amount of the cylindrical length l of the tool 1, increased by one tooth spacing $a_s$. The advantages in conjunction with the short chips s and the low metal-cutting machining speeds s, in conjunction with high feed rates $L_g$ also occur in this variant embodiment.

In FIG. 5, an exemplary embodiment of a multi-stage tool according to the invention is shown schematically. By simple refinement of the features described in conjunction with FIGS. 1 through 4, a tool with two or more stages can be designed, with which it is possible to master machining situations in which the requisite machining depth t is greater than the allowable chip thickness. Two or more tools 1 are mounted on the same axis of rotation O. The function is ensured because of the equality of the tooth spacing and the effective lengths l of the tools. The diameters of the circumferential milling cutters are selected differently, to suit the chip thicknesses.

FIG. 6 is a schematic view of a circumferential milling cutter 1, embodied according to the invention, which is used for machining tangential portions of curved travel surface profiles of railroad tracks. The tool 1, whose spiral cutting edges, in a position parallel to its axis of rotation O, contact the machining surface, is similarly to what is shown in FIGS. 1 through 5 disposed tangentially to one of the machining lanes of the travel surface of the rail. Between the circumferential milling cutter 1 and the workpiece 2, parallel to the machining surface B, a relative motion at the feed rate $L_g$ takes place along the machining surface B. The machining of the curved travel edge is done with a cutting track that extends at a tangent to the rail profile.

When rails are used their travel surfaces have geometric and metallurgical flaws, which have a harmful influence on both service life and smoothness of travel. The rails are resurfaces by machining off the defective zones and deformations. For performing this activity, among other things, circumferential milling cutter technologies are employed that have low productivity and low working speeds, as a rule below 3 km/h. However, these values can be achieved with high cutting speeds, which in combination with short service lives result in high machining costs. The use of the milling method of the invention is advantageous in terms of both process and economy and enables much higher productivity, which attains the objective, at the speed of a slowly moving train. Thus resurfacing the rails can be done during scheduled operation, without interrupting train operation by blocking the tracks.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A method for machining a longitudinal edge of an elongated metal workpiece (2) with a circumferential milling cutter (1) rotatable about a rotation axis and having at least one spiral cutting edge, the method comprising:
    contacting a longitudinal machining surface (B) of the workpiece (2) by the at least one cutting edge (z) of the milling cutter (1) with a plurality of teeth simultaneously;
    providing relative movement between the workpiece (2) and the milling cutter in the direction of the rotation axis of the milling cutter (1);
    wherein the plurality of teeth contact the machining surface (B) simultaneously with identical tooth spacings (as) in a direction of the relative movement;
    engaging the plurality of teeth (z), with the machining surface (B) over a cylindrical effective length (l) of the milling cutter (1) during machining of the workpiece (2) during the relative movement, wherein each of the plurality of teeth (z) has an identical cutting depth (t); and
    removing chips (s) is effected between adjacent teeth having the tooth spacing (as) simultaneously with the relative movement.

2. The method of claim 1, wherein the circumferential milling cutter (1) has, at an end thereof, a conical portion (k) that facilitates the engagement of the cylindrical effective length (l) of the milling cutter (1) with the workpiece (2).

3. The method of claim 1, wherein the at least one spiral cutting edge is embodied as cutting threads of the circumferential milling cutter (1).

4. The method of claim 1, wherein the workpiece (2) is a rail.

* * * * *